(12) United States Patent
Quaas et al.

(10) Patent No.: US 12,253,470 B2
(45) Date of Patent: Mar. 18, 2025

(54) PLASMA SOURCE CHAMBER FOR A SPECTROMETER

(71) Applicant: Thermo Fisher Scientific (Bremen) GmbH, Bremen (DE)

(72) Inventors: Norbert Quaas, Bremen (DE); Ayrat Murtazin, Bremen (DE); Sebastian Geisler, Bremen (DE); Tobias Wolf, Bremen (DE); Jan Rathkamp, Bremen (DE); Dirk Wohlers, Bremen (DE); Mikhail Skoblin, Dolgoprudny (RU)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 502 days.

(21) Appl. No.: 17/598,839

(22) PCT Filed: Apr. 8, 2020

(86) PCT No.: PCT/EP2020/060048
§ 371 (c)(1),
(2) Date: Sep. 27, 2021

(87) PCT Pub. No.: WO2020/208085
PCT Pub. Date: Oct. 15, 2020

(65) Prior Publication Data
US 2022/0187212 A1 Jun. 16, 2022

(30) Foreign Application Priority Data
Apr. 10, 2019 (GB) ...................................... 1905069

(51) Int. Cl.
*G01N 21/73* (2006.01)
*H05H 1/30* (2006.01)

(52) U.S. Cl.
CPC ............... *G01N 21/73* (2013.01); *H05H 1/30* (2013.01); *G01N 2201/022* (2013.01)

(58) Field of Classification Search
CPC ..... G01N 21/73; G01N 2201/022; H05H 1/30
(Continued)

(56) References Cited

U.S. PATENT DOCUMENTS 2,401,443 A * 6/1946 Arthur ..................... C23C 14/52
118/713
3,875,068 A * 4/1975 Mitzel ..................... B01J 19/126
422/906
(Continued)

FOREIGN PATENT DOCUMENTS

CN 102269707 A 12/2011
DE 4412902 A1 * 11/1994 ........... C23C 14/566
(Continued)

*Primary Examiner* — Sunghee Y Gray
(74) *Attorney, Agent, or Firm* — Thomas F. Cooney

(57) ABSTRACT

A plasma source chamber (10) for use in a spectrometer comprises an inner housing (11) for accommodating a plasma source (31) and an outer housing (12) accommodating the inner housing. The outer housing (12) comprises at least one outer air inlet opening (21) in a first wall and at least one outer air outlet opening (22) in a second wall. Walls of the inner housing and walls of the outer housing define a spacing (25) so as to allow a first air flow (1) from the at least one outer air inlet opening (21) to the at least one outer air outlet opening (22) through the spacing (25) between the inner housing and the outer housing. The inner housing (11) comprises at least one inner air inlet opening (23) in a first wall and at least one inner air outlet opening (24) in a second wall to allow a second air flow (2) from the at least one inner air inlet opening to the at least one inner air outlet opening through the inner housing. Thus, an improved cooling of the outer surfaces of the plasma source chamber is achieved.

25 Claims, 6 Drawing Sheets

(58) Field of Classification Search
USPC .......................................................... 356/315
See application file for complete search history.

(56) References Cited

U.S. PATENT DOCUMENTS

| | | | |
|---|---|---|---|
| 5,066,125 | A | 11/1991 | Rogers et al. |
| 2010/0029058 | A1 | 2/2010 | Shimomura et al. |
| 2010/0224322 | A1 | 9/2010 | Sui et al. |
| 2012/0224175 | A1* | 9/2012 | Minghetti .......... G01N 21/6404 356/316 |
| 2014/0118735 | A1 | 5/2014 | Matsushita |
| 2016/0181066 | A1 | 6/2016 | Brors et al. |
| 2019/0098740 | A1* | 3/2019 | Yamazawa ........ H01J 37/32174 |

FOREIGN PATENT DOCUMENTS

| | | | |
|---|---|---|---|
| DE | 69907687 T2 * | 3/2004 | |
| GB | 1401291 A | 7/1975 | |
| JP | H01158334 A | 6/1989 | |
| KR | 101336594 B1 * | 12/2013 | |

* cited by examiner

PLASMA SOURCE CHAMBER FOR A SPECTROMETER

CROSS REFERENCE TO RELATED APPLICATIONS

This application is the US National Stage, under 35 USC § 371, of international application No. PCT/EP2020/060048, now expired, filed on Apr. 8, 2020, which claims priority to United Kingdom application No. 1905069.9, now Patent No. GB2582948, which was filed on Apr. 10, 2019.

FIELD OF THE INVENTION

The present invention relates to a plasma source chamber for a spectrometer. More in particular, the present invention relates to a plasma source chamber for use in a spectrometer which is capable of accommodating a plasma source without requiring an active cooling element within the chamber.

BACKGROUND OF THE INVENTION

It is well known to use plasma sources in spectrometers, such as emission spectrometers and mass spectrometers. A plasma source, such as an inductively coupled plasma (ICP) source, produces a plasma in which atoms and molecules can be ionized. In such a plasma, extremely high temperatures may occur, such as temperatures of 8,000 K or even 10,000 K. In conventional spectrometers, plasma sources were accommodated in large chambers, thus allowing relatively large distances between the plasma and the walls and other parts of the chamber. As the users of spectrometers increasingly desire more compact instruments, the dimensions of plasma source chambers have decreased, leading to smaller distances between the plasma source and other parts. It will be understood that this creates problems relating to temperatures and temperature gradients.

It is well known to use an air flow inside a plasma chamber for cooling. The Thermo Scientific™ iCAP™ 7000 ICP-OES Analyzer system produced by Thermo Fisher Scientific®, for example, has a plasma chamber in which a plasma torch is accommodated and in which an air flow is used for cooling. An air outlet opening is provided in the top wall of the plasma chamber, above the plasma torch, while an air inlet opening is provided in the bottom wall, near a side wall, thus allowing an air flow from the bottom to the top of the chamber, past the plasma torch. Although this arrangement works well for a vertical torch that is viewed radially, it is less suitable for axial viewing of a vertical torch. For this reason, the torch of the iCAP™ 7000 system is arranged horizontally while retaining the top air outlet and allowing axial viewing from the side in dual view arrangements.

To retain the freedom to mount the plasma torch either horizontally or vertically, as desired, in both single view and dual view arrangements, it would be possible to provide a top air outlet at the side of the plasma chamber, thus freeing up space above the plasma torch. However, an air outlet away from the center of the plasma chamber would give rise to crossflows of air, which may disturb the plasma and lead to instability of the plasma source. However, the air flow should be sufficiently large to cool the plasma chamber such that its outer surface does not constitute a safety hazard, even when the dimensions of the plasma chamber are limited.

Japanese patent application JP2005-205296 discloses an ICP spectrometer with an exhaust gas cooling apparatus. The plasma chamber of JP2005-205296 has an elbow-shaped pre-cooling pipe which is fixed to a pre-cooler. A gas cooler disposed downstream of a pre-cooling pipe contains a water-cooled heat exchange coil. An exhaust fan is also provided. The elbow shape of the cooling pipe prevents a line of sight between the inlet and the outlet, which is in some applications undesirable. In addition, the plasma chamber of JP2005-205296 requires a precooler, a gas cooler and a fan, making the arrangement complicated and relatively expensive.

SUMMARY OF THE INVENTION

The present invention seeks to overcome the disadvantages of the prior art and to provide a plasma source chamber for a spectrometer which may be compact, which allows a vertical plasma source to be used and which does not require an active cooling mechanism. In particular, the present invention seeks to provide a plasma source chamber which provides sufficient cooling of its outer surface without requiring a strong air flow which disturbs the plasma.

Accordingly, the present invention provides a plasma source chamber for use in a spectrometer, the plasma source chamber comprising an inner housing for accommodating a plasma source, and an outer housing accommodating the inner housing, wherein the outer housing comprises at least one outer air inlet opening in a first wall and at least one outer air outlet opening in a second wall, wherein walls of the inner housing and walls of the outer housing define a spacing so as to allow a first air flow from the at least one outer air inlet opening to the at least one outer air outlet opening through the spacing between the inner housing and the outer housing, and wherein the inner housing comprises at least one inner air inlet opening in a first wall and at least one inner air outlet opening in a second wall to allow a second air flow from the at least one inner air inlet opening to the at least one inner air outlet opening through the inner housing.

By providing both an inner housing and an outer housing, a double-layered heat protection structure is obtained. By providing a spacing between the inner housing and the outer housing, a direct heat transfer between the inner housing and the outer housing is avoided, thus significantly improving the heat insulation. In addition, the spacing allows an air flow to pass between the inner housing and the outer housing, thus cooling the outer housing with air that does not pass through the inner housing. As a result, the air flow that does pass through the inner housing can be limited in volume and velocity, while the temperature of the outer housing can be limited to values which comply with safety regulations, even when the interior volume of the plasma source chamber is small. In particular, the invention allows total air flow rates of less than 250 m$^3$/h to be used in certain embodiments. The plasma source chamber of the invention may be suitable for both radial and axial observation of the plasma, also when a vertical plasma torch is used.

In advantageous embodiments of the invention the walls, the inlets and the outlets are arranged such that in use the first air flow is greater than the second air flow. That is, in such embodiments the air flow through the outer housing is greater in volume and/or air speed than the air flow through the inner housing. Conversely, the air flow through the inner housing is smaller than the air flow through the outer housing, thus preventing the plasma being disturbed by the air flow. This may be achieved by the relative dimensions of the air inlet openings and the air outlet openings, and on their relative orientations.

The present invention is based upon the insight that the air flows in a plasma source chamber should be guided in such a way that the outer surface of the plasma source chamber is cooled sufficiently. The present invention benefits from the further insight that the air flow at and around the plasma torch should be limited in volume and velocity so as to avoid the plasma being disturbed by the air flow.

The present invention also benefits from the still further insight that providing a spaced inner and outer housing allows an air flow through the spacing and hence allows the outer surface to be cooled while leading air away from the plasma in the inner housing.

In order to avoid the plasma being disturbed by the air flow, it is preferred that the air flow through the inner housing is smaller than the air flow through the spacing between the inner housing and the outer housing. In other words, the main air flow is led around instead of through the inner housing.

Both the inner housing and the outer housing have at least one air inlet opening in a first wall and at least one air outlet opening in a second wall, the first wall and the second wall preferably being different walls, such as opposite side walls. In either the inner housing and the outer housing, or in both, the at least one air inlet opening may be located, in use, lower than the at least one outlet opening. That is, the inlet openings may be located at and/or in a bottom wall while the outlet openings may be located at and/or in a top wall of the inner and outer housing when the plasma chamber is in use. In this way, the natural air flow is facilitated, as the air will heat up considerably as it passes through the plasma chamber. As air expands when it heats up, the air outlet openings may advantageously be larger than the air inlet openings, that is, the air outlet openings may have a larger cross-section, for example.

The at least one outer air inlet opening, that is, the air inlet opening of the outer housing, may extend over substantially the width of a wall of the outer housing. Similarly, the at least one outer air outlet opening, that is, the air outlet opening of the outer housing, may extend over substantially the width of a wall of the outer housing. Additionally, or alternatively, at least one air inlet opening of the inner housing and/or at least one air inlet opening of the outer housing may extend over substantially the width of a wall of the inner housing.

In the plasma source chamber according to the invention, the at least one inner air inlet opening may be in direct communication with the spacing between the inner housing and the outer housing. As a result, the air flow through the inner housing (which may be referred to as second air flow) may be derived from the air flow through the spacing between the inner housing and the outer housing (which may be referred to as first air flow). That is, part of the (first) air flow through the spacing branches off to constitute the (second) air flow through the inner housing.

Alternatively, the at least one inner air inlet opening may be connected to a duct which extends through the spacing and through a wall of the outer housing so as to allow an air flow from outside the outer housing. In such embodiments, the (first) air flow through the spacing and the (second) air flow through the inner housing are separate air flows.

Similarly, the at least one inner air outlet opening may be in direct communication with the spacing between the inner housing and the outer housing. That is, the (second) air flow through the inner housing may join the (first) air flow in the spacing, preferably at or near an air outlet opening of the outer housing. Alternatively, or additionally, the at least one inner air outlet opening may be connected to a duct which extends through the spacing and through a wall of the outer housing so as to allow an air flow to the outside of the outer housing.

In a particularly advantageous embodiment, the inner housing is removable. That is, the inner housing may be removed from the plasma chamber and may therefore be removably attached to the outer housing. By providing a removable inner housing, the interior of the plasma chamber can more easily be cleaned, which may be necessary due to a built-up of deposits in the inner housing. In addition, by providing a removable inner housing, the inner housing can be replaced when necessary.

In an embodiment, the plasma source chamber may further comprise a shielding element located outside the outer housing for covering at least one wall of the outer housing, said shielding element and said wall defining a further spacing so as to allow a third flow of air between said shielding element and the outer housing. The further spacing and the associated air flow provides cooling of the exterior of the outer housing, while providing additional heat insulation due to the additional layer constituted by the shielding element. The shielding element may be arranged for covering two substantially perpendicular walls of the outer housing, the further spacing extending between said shielding element and said walls, one of said walls preferably being, in use, a top wall. The shielding element may face the (typically temperature sensitive) optics section of the spectrometer.

As mentioned above, both the inner housing and the outer housing may have more than one air inlet opening and/or more than one air outlet opening. In particular, the inner housing may have at least one further air inlet opening in a wall which is, in use, a bottom wall. Further openings may be provided in walls of both the inner housing and outer housing to accommodate a plasma source and at least one viewing element, such as a periscope, for viewing the plasma. As there is no need for an air outlet opening immediately above the plasma torch in such an arrangement, an axial viewing element can be located substantially above the plasma torch. An axial viewing element may be purged by a supply of argon to provide a purged optical path.

The plasma source chamber according to the present invention may comprise an inner door for the inner housing and an outer door for the outer housing, which doors may be coupled to provide a combined motion of the doors. At least one of the inner door and the outer door may be a sliding door. In an embodiment, both the inner door and the outer door are sliding doors.

The plasma source chamber according to the present invention may advantageously be arranged for accommodating a vertical plasma source. However, embodiments accommodating a horizontal plasma source are also possible. In either orientation, the plasma source may be an inductively coupled plasma (ICP) source. Other sources, such as a flame source, an MIP (Microwave-Induced Plasma) source, or an ETA (Electro-Thermo Ionization) source, may also be arranged horizontally or vertically in the source chamber of the present invention.

The present invention additionally provides a spectrometer, such as an emission spectrometer, more in particular an optical emission spectrometer, or a mass spectrometer, comprising a plasma source chamber as described above. An emission spectrometer according to the invention may further comprise a sample introduction system for introducing a sample to be analyzed into the plasma and a detection unit for detecting the emission of the plasma. A mass spectrometer according to the invention may further comprise a skimmer cone, a sampling cone, at least one mass filter, such as a quadrupole mass filter, ion optics, and a detection unit for detecting ions. The spectrometer provided by the invention may alternatively be an atomic fluorescence spectrometer or an atomic absorption spectrometer.

DETAILED DESCRIPTION OF THE DRAWINGS

Figure 1:
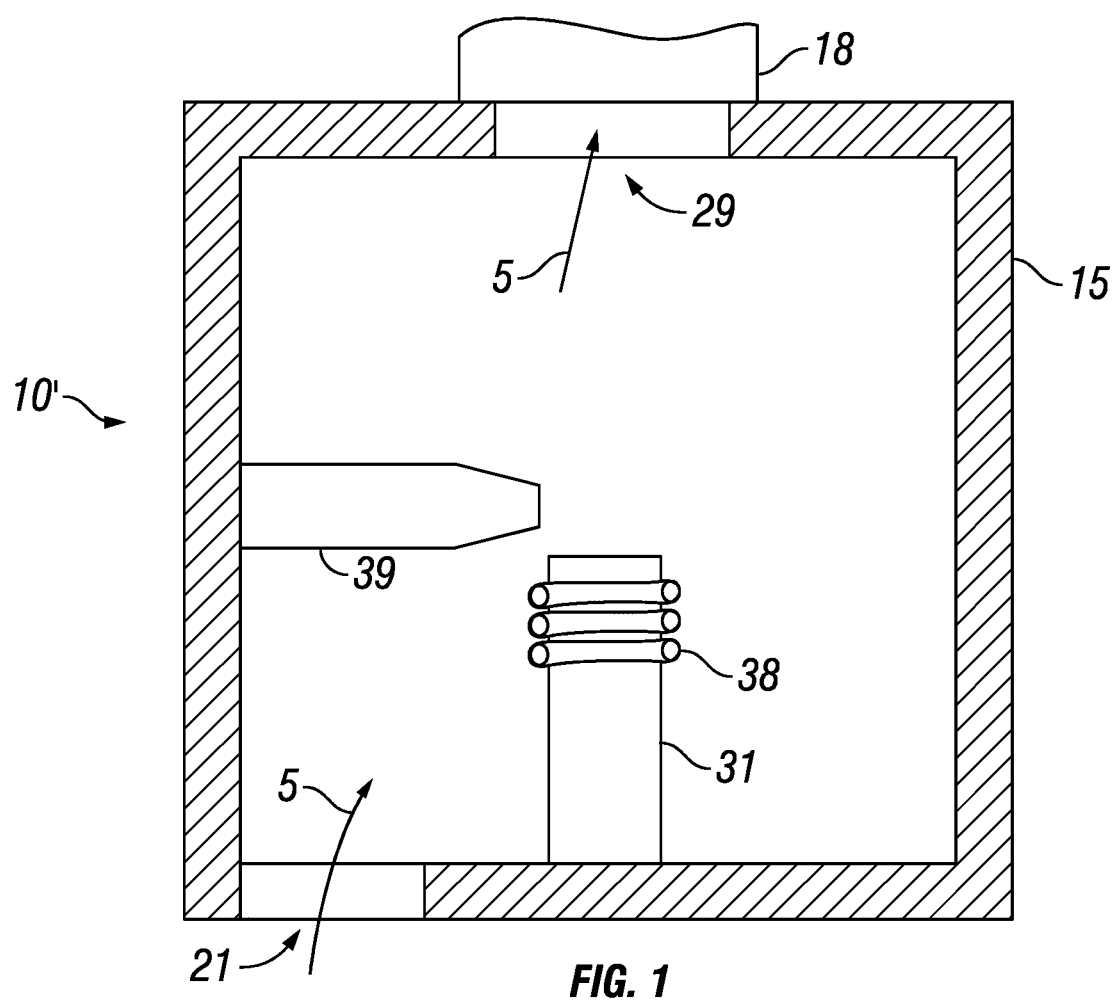
FIG. 1 schematically shows an exemplary embodiment of a plasma source chamber according to the prior art.

A plasma chamber according to the prior art is schematically illustrated in the cross-sectional view of FIG. 1. A plasma chamber (or plasma source chamber) of this kind is used, for example, in the iCAP 7000™ mass spectrometer manufactured by Thermo Fisher Scientific®. The plasma chamber 10' is shown to comprise a housing 15 in which a plasma torch 31 is accommodated. The plasma torch 31 is provided with an RF electrical induction coil 38 which is arranged around a part of the length of the plasma torch 31. The RF electrical induction coil 38 serves as heating element to generate a plasma. A viewing element 39 protrudes from a side wall of the plasma chamber to view the plasma in use from the side. An exhaust pipe 18 is arranged on the top wall of the plasma chamber 10' in direct communication with an air outlet opening 29, which is located above the plasma torch 31. An air inlet opening 21 is provided in the bottom wall of the plasma chamber, adjacent a side wall.

The location of the exhaust pipe 18 prevents a viewing element to be located in the top wall of the plasma chamber, which is less convenient in some applications. In addition, the air flow 5 through the plasma chamber is from the air inlet opening 21 past the plasma above the plasma torch 31 to the air outlet opening 29. It will be understood that the air flow cannot be too strong, or the plasma will be disturbed.

Figure 2:
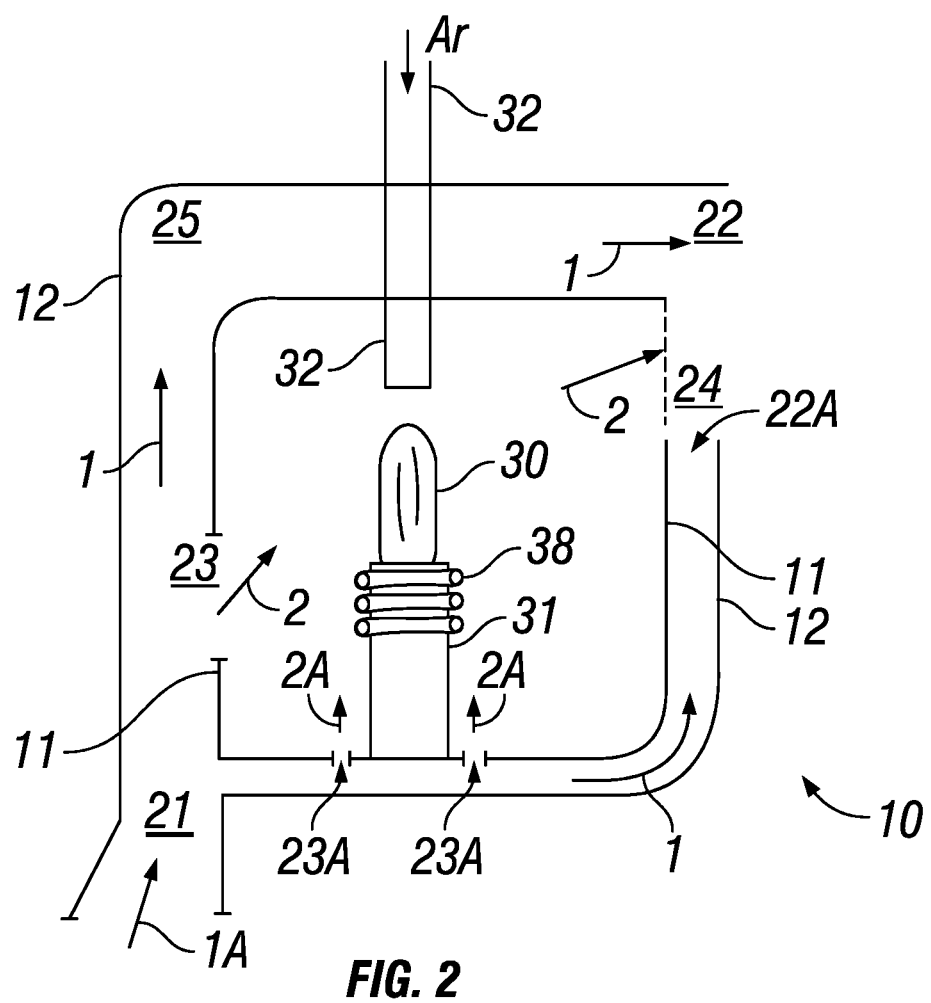
FIG. 2 schematically shows a first exemplary embodiment of a plasma source chamber according to the present invention.

The exemplary embodiment of a plasma source chamber 10 according to the invention which is schematically shown in the cross-sectional view of FIG. 2 comprises an inner housing (or inner chamber) 11 which is accommodated in an outer housing (or outer chamber) 12. In the inner housing 11, a plasma torch 31 is arranged which, in use, can produce a plasma 30. Above the plasma torch 31, a viewing element 32 is arranged for axially viewing the plasma. The viewing element 32 is, in the embodiment shown, constituted by a pipe through which a gas is fed to provide a purged optical path. The gas is preferably an oxygen-free dry gas, such as argon (Ar), to allow the transmission of deep ultra-violet (UV) light through the viewing element 32. It is noted that in the embodiment shown, the plasma torch is arranged, in use, vertically in the inner housing 11, and that the viewing element 32 is arranged substantially axially above the plasma torch 31.

The inner housing 11 is provided with an air inlet opening 23 and an air outlet opening 24, which are in the embodiment shown arranged in opposite walls of the inner housing 11, so as to allow an air flow 2 through the inner housing 11. Additional air inlet openings may be present in the walls of the inner housing, such as the air inlet openings 23A arranged in the bottom wall adjacent the plasma torch 31, which allow additional air flows 2A through the inner housing. Similarly, additional air outlet openings may be provided. In the embodiment shown, the air outlet opening 24 is located, in use, higher than the air inlet openings 23 and 23A so as to assist a natural flow of the air which is heated by the plasma. However, in some embodiments the air inlet openings may be located at substantially the same height, or even higher than the air outlet openings.

The outer housing 12 is provided, in the embodiment shown, with an air inlet opening 21, an air outlet opening 22 and an additional air outlet opening 22A. in the embodiment shown, the air inlet and outlet openings 21 and 22 are arranged at opposite walls of the outer housing 12, while the air outlet openings 22 and 22A are arranged higher, in use, than the air inlet opening 21, to assist the natural flow of the heated air through the outer housing. However, in some embodiments the air inlet openings may be located at substantially the same height, or even higher than the air outlet openings.

In accordance with the invention, a spacing 25 is present between the inner housing 11 and the outer housing 12, which allows air flows 1 through the outer housing 12 but substantially around the inner housing 11. It can be seen in the embodiment of FIG. 2 that air flows 1 are present around all four walls of the inner housing 11 which are shown in FIG. 2.

It will be understood that such air flows may also be present in spacings (not shown in FIG. 2) between the respective front walls of the inner housing and the outer housing, and/or between the respective back walls of the inner housing and the outer housing. In some embodiments, no spacings through which air flows are provided at the front and/or the back of the plasma source chamber, only spacings between at least one pair of side walls (that is, between respective side walls of the inner housing and the outer housing) and at least one pair of upper walls (that is, between respective upper walls or covers of the inner housing and the outer housing).

By providing a spacing between the inner housing and the outer housing, air can flow between the inner housing and the outer housing. In addition, the double wall thus provided above the plasma torch provides a double shielding of any object above the plasma chamber from the heat of the plasma torch.

In accordance with a further aspect of the invention, the inner housing 11 and the outer housing 12 are arranged in such a way that the air flow 1 through the spacing between the inner housing and the outer housing is greater than the air flow 2 through the inner housing 11. That is, the (second) air flow 2 through the inner housing 11 has for example a smaller volume rate than the (first) air flow 1 through the spacing 25. By passing a smaller part of the total air flow through the inner housing 11 and a larger part through the spacing 25, a strong air flow past the plasma and hence a disturbance of the plasma is avoided, while providing an excellent cooling effect of both the inner and the outer housing.

A smaller air flow passing through the inner housing can be obtained by a suitable choice of (relative) dimensions. In particular, the diameters and/or surface areas of air inlet opening 23 and of air outlet opening 24 of the inner housing 11 as well as the diameters and/or surface areas of air inlet opening 21 and of air outlet openings 22 and 22A of the outer housing 12 are chosen such that the first air flow 1 through the spacing is greater than the second air flow 2 through the inner housing. Also, the relative orientations of the various openings contribute in providing the desired air flows. The orientation of the inlet opening 23, for example, is substantially perpendicular to the longitudinal direction of the spacing 25 at the location of the inlet opening 23. As a result, the air flow through the spacing 25 is not directed to but along the inlet opening 23. This contributes to reducing the air flow 2 through the inner housing relative to the air flow through the spacing.

In the exemplary embodiment shown, the spacing between the inner housing 11 and the outer housing 12 has a width of approximately 3 cm, both at the side wall where the opening 23 is located and at the top walls. The air inlet opening 21 and the air outlet opening 22 both have, in the embodiment shown, an area of approximately 48 cm$^2$, while the air inlet opening 23 has an area of approximately 24 cm$^2$ and the air outlet opening 24 has an area of approximately 52 cm$^2$. It can thus be seen that the area of the air inlet opening 23 of the inner housing is approximately half the size of the area of the air inlet opening 21 of the outer housing, while the area of the air outlet opening 24 of the inner housing is more than twice the size of the air inlet opening 23 of the inner housing, in this example approximately 2.2 times as large. The additional air outlet opening 22A may have an area of approximately 11 cm$^2$, that is, approximately one quarter of the area of the air outlet opening 22.

It will be understood that the dimensions given above are only examples and that actual dimensions of a plasma source chamber according to the invention may vary, also in dependence on their relative orientations. For example, the air inlet opening 23 of the inner housing is, in the example shown, arranged at a right angle relative to the air inlet opening 21 of the outer housing. If this angle were more or less than 90°, the area of the air inlet opening 23 of the inner housing could be adapted to achieve the same air flow 2. Similarly, the additional air inlet openings 23A of the inner housing are, in the example shown, arranged at a right angle relative to the air flow 1 through the spacing and may have other dimensions when arranged at a different angle.

The ratio of the areas of the air inlet opening 23 of the inner housing and of the air inlet opening 21 of the outer housing need not be approximately equal to 0.5 but could be in a range from 0.1 to 2.0, or in a range from 0.25 to 1.0, for example. Similarly, the ratio of the areas of the air outlet opening 24 of the inner housing and of the air inlet opening 23 of the inner housing need not be approximately equal to 2 but could be in a range from 1 to 4, or in a range from 1.5 to 3, for example.

Figure 3:
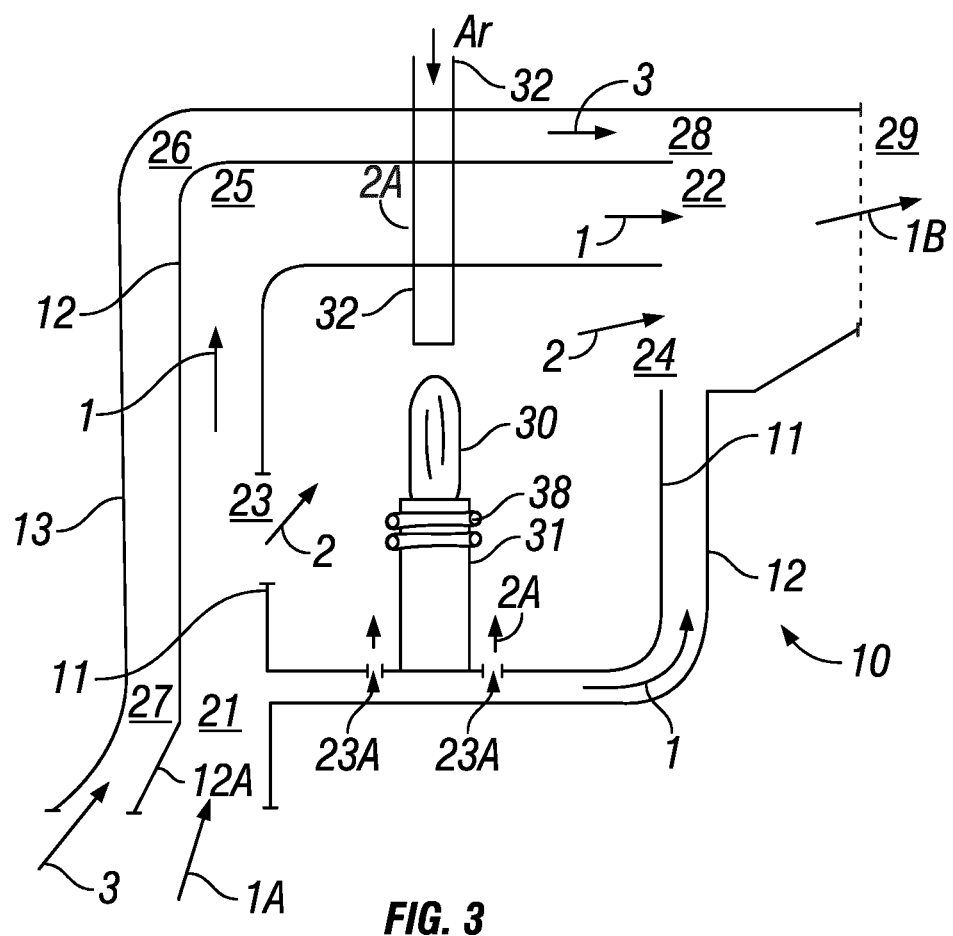
FIG. 3 schematically shows a second exemplary embodiment of a plasma source chamber according to the present invention.

Both the shielding effect and the air-cooling effect may be further improved by providing a shielding member, as shown in FIG. 3. The exemplary embodiment of FIG. 3 also comprises an inner housing 11 and an outer housing 12, as the embodiment of FIG. 2. In addition, the embodiment of FIG. 3 comprises a shielding member 13 which extends, in the embodiment shown, over a side wall and the top wall so as to provide an additional shielding layer between the plasma source 31 and any objects located above the plasma chamber 10. In addition, the shielding element 13 can be spaced apart from the outer housing 13 to provide an additional spacing 26 through which an additional air flow 3 can flow. This additional air flow 3 provides additional cooling of the outer surface of the plasma chamber, thus resulting in a lower temperature.

It is noted that the shielding member 13 may, in some embodiments, extend over more than two wall parts than shown in FIG. 3, and may for example also extend over a back wall. Thus, the shielding element may serve as an additional outer housing. Alternatively, the shielding element may extend over only a single wall part, for example only the top wall, or possibly only a side wall.

As can be seen in FIG. 3, the shielding element 13 extends substantially in parallel to the walls of the outer housing 12 at some distance (for example a few centimeters or a few millimeters) from those walls, leaving a spacing 26 between the outer housing 12 and the shielding element 13. In accordance with the invention, this additional spacing 26 may advantageously be used to pass a further air flow through the plasma chamber 10. An additional air inlet opening 27 is provided to allow an additional or third air flow 3 to pass through the spacing 26 between the outer housing 12 and the shielding element 13. In the embodiment shown, an opening 28 located adjacent the (outer) air outlet opening 22 constitutes the air outlet opening of the additional spacing 26. In the embodiment of FIG. 3, a common air outlet opening or exhaust opening 29 is provided through which the first air flow 1, the second air flow 2 and the third air flow 3 exit the plasma chamber.

In the exemplary embodiment shown, the air outlet opening 29 has an area of approximately 130 cm$^2$ while the air inlet opening 27 has an area of approximately 8 cm$^2$, resulting in a ratio of approximately 16. Of course, other ratios are possible, for example ratios in a range from approximately 4 to approximately 64, or from approximately 8 to approximately 32.

Figure 4:
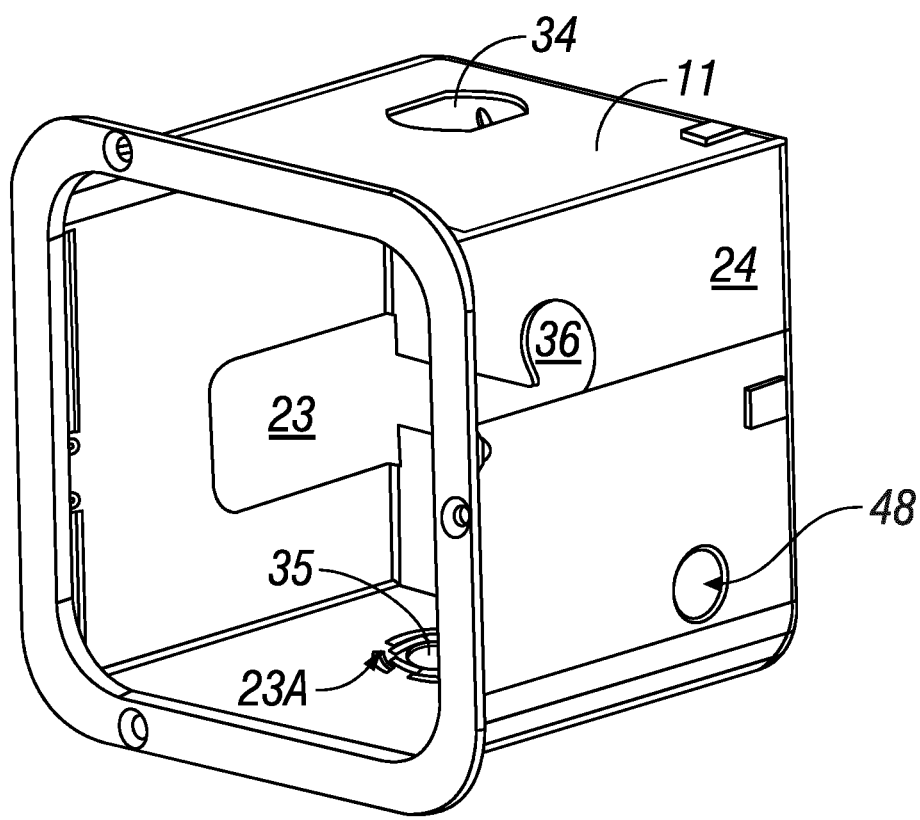
FIG. 4 schematically shows an embodiment of an inner housing of a plasma source chamber according to the present invention.

An embodiment of an inner housing 11 is schematically shown in perspective view in FIG. 4. The inner housing 11 is shown to have an air inlet opening 23 in one side wall and an air outlet opening 24 in another side wall, opposite the first side wall. It can be seen that in the embodiment shown, the air outlet opening 24 is located higher than the air inlet opening 23.

The inner housing 11 of FIG. 4 further comprises a viewing opening 34 in the top wall to accommodate an axial plasma viewing element (32 in FIGS. 1 and 2) which can constitute a purged optical path. The viewing opening 34 is preferably as small as possible. The inner housing 11 also comprises a plasma torch opening 35 to accommodate a plasma torch (31 in FIGS. 2 and 3). The inner housing may comprise further openings, such as further air inlet openings 23A (see also FIGS. 2 and 3) surrounding the plasma torch opening 35. The back wall of the embodiment shown is provided with an opening 36 for accommodating a radial plasma viewing element (39 in FIG. 6). It will be understood that the opening 36 for accommodating a radial plasma viewing element could be arranged in any side wall instead. In the embodiment shown, a side wall is provided with a video camera opening 48 for allowing a plasma video camera to view the plasma. In the embodiment shown, the opening 48 is arranged below the air outlet opening 24. In some embodiments, such a video camera opening may be omitted.

Figure 5:
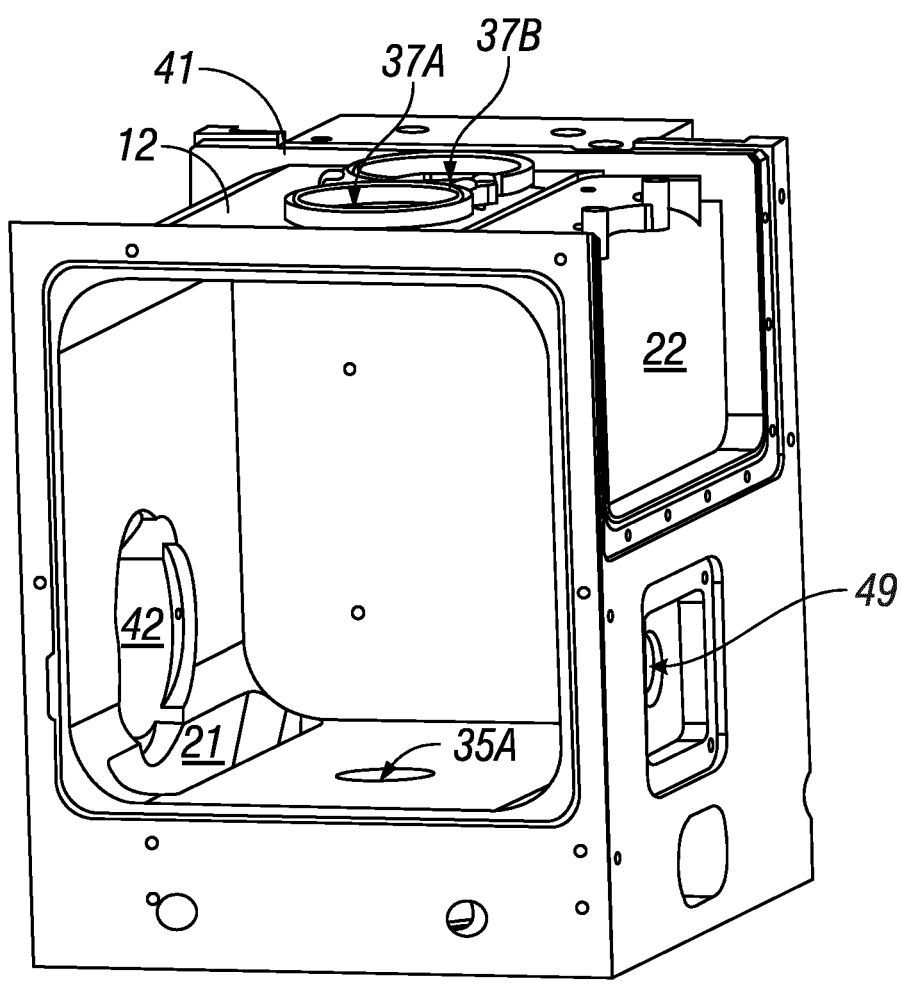
FIG. 5 schematically shows an embodiment of an outer housing of a plasma source chamber according to the present invention.

An embodiment of an outer housing 12 according to the invention is illustrated in the perspective view of FIG. 5. The outer housing is shown to have an air inlet opening 21 at a bottom corner, in both a side wall and a bottom wall, as well as an air outlet opening 22 located in the upper part of a side wall, opposite the side wall adjacent the air inlet opening 21. An opening 35A, corresponding with the opening 35 in the inner housing 11 (see FIG. 4), is provided to accommodate the plasma torch 31 (see FIGS. 1 & 2). Two adjacent openings 37A and 37B in the top wall of the outer housing 12 are provided to accommodate a radial plasma viewing element, such as a periscope, and an axial plasma viewing element (32 in FIGS. 1 & 2) respectively. The opening 37A in the outer housing 12 corresponds with the opening 34 in the inner housing 11 (see FIG. 4). An opening 42 in a side wall serves to accommodate an RF electrical heating element or RF induction coil (38 in FIGS. 2 & 3) and corresponds with the opening 23 in the inner housing 11 (see FIG. 4). A radial viewing element can be accommodated by opening 37B in the outer housing 12 and opening 36 in the inner housing 11. A side wall is provided with a video camera opening 49 for allowing a plasma video camera to view the plasma. The opening 49 in the outer housing is, in use, aligned with the corresponding video camera opening 48 in the inner housing (see FIG. 4). In the embodiment shown, the opening 49 is arranged below the air outlet opening 22. In some embodiments, such a video camera opening 49 may be omitted. A ridge 41 at the top of the back wall and front wall of the outerhousing 12 defines the spacing (26 in FIG. 3) between the outer housing and the shielding element (13 in FIG. 3).

The inner housing and the outer housing are preferably made of metal, such as stainless steel or aluminium. The inner housing and/or the outer housing may be produced by milling, casting, or a combination of sheet metal cutting, bending and welding.

The inner housing may be removable so as to allow cleaning and/or replacement. This is advantageous as sample nebulization in the plasma torch will inevitably result in materials being deposited in the plasma chamber, that is, in the inner housing 11. A removable inner housing is easier to clean and may be replaced when cleaning is not or no longer feasible.

Figure 6:
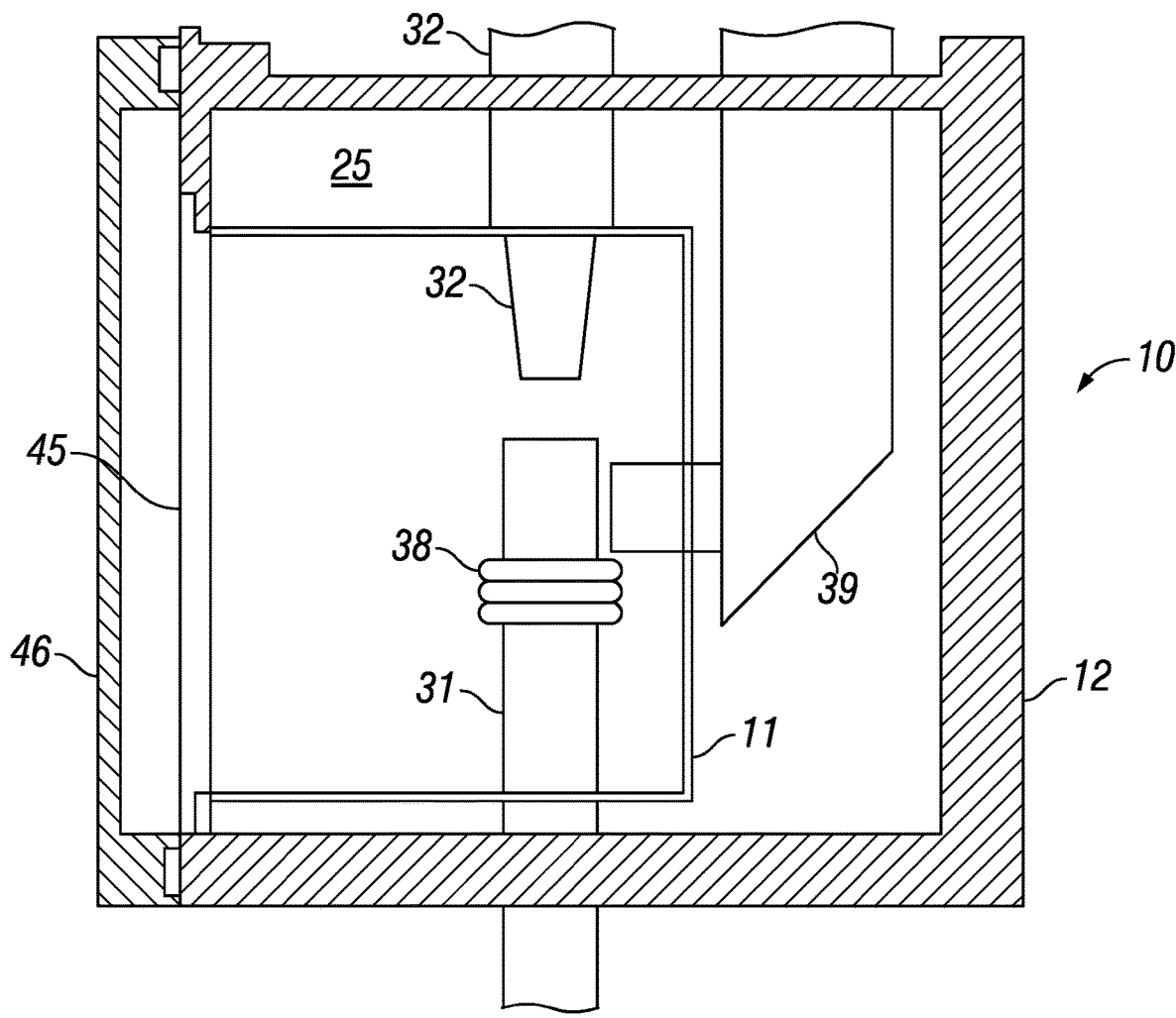
FIG. 6 schematically shows an embodiment a plasma source chamber according to the present invention.

An exemplary embodiment of a plasma source chamber according to the invention is schematically shown in the cross-sectional view of FIG. 6. The plasma source chamber 10 of FIG. 6 is shown to comprise an inner housing 11 and an outer housing 12, between which a spacing 25 is present. A plasma torch 31 provided with an RF coil 38 protrudes through an opening (35 in FIG. 4 in the bottom wall of the inner housing 11, while a viewing element 32 protrudes through an opening (34 in FIG. 4) in the top wall of the inner housing 11. The viewing element 32 enters the outer housing 12 through a further opening (37A in FIG. 5). A periscopic viewing element 39 protrudes through an opening (37B in FIG. 5) in the top wall of the outer housing 12 and through an opening (36 in FIG. 4) in a back wall of the inner housing 11. The periscopic viewing element 39 allows radial viewing of a plasma generated by the plasma torch 31. Axial viewing of the plasma is, in this embodiment, possible by viewing through the viewing element 32. It can be seen that the viewing element 39 is arranged in the spacing between the inner housing 11 and the outer housing 12.

The inner housing 11 is, in the embodiment shown, closed off by a door 45. Similarly, the outer housing 12 is closed off by a door 46. The inner door 45 and the outer door 46 may for example be hinged and/or removable. They may be connected by a mechanism allowing the doors 45 and 46 to be moved together, for example such that when the outer door 46 is opened or closed by an operator, the inner door is opened or closed respectively by the mechanism connecting the inner door and the outer door. At least one of the doors 45 and 46 may be a sliding door. In an embodiment, both the inner door 45 and the outer door 46 are sliding doors.

The plasma source chamber of the present invention is particularly suitable for emission spectrometers, but may also be applied in other spectrometers, such as mass spectrometers and atomic absorption spectrometers. Emission spectrometers in which the invention may be utilized are, for example, optical emission spectrometers and atomic fluorescence spectrometers. Although the source chamber is described here with reference to a plasma source (that is, an ICP torch), the invention is not so limited and may also be used with a flame source, an MIP (Microwave-Induced Plasma) source, or an ETA (Electro-Thermo Ionization) source.

Figure 7:
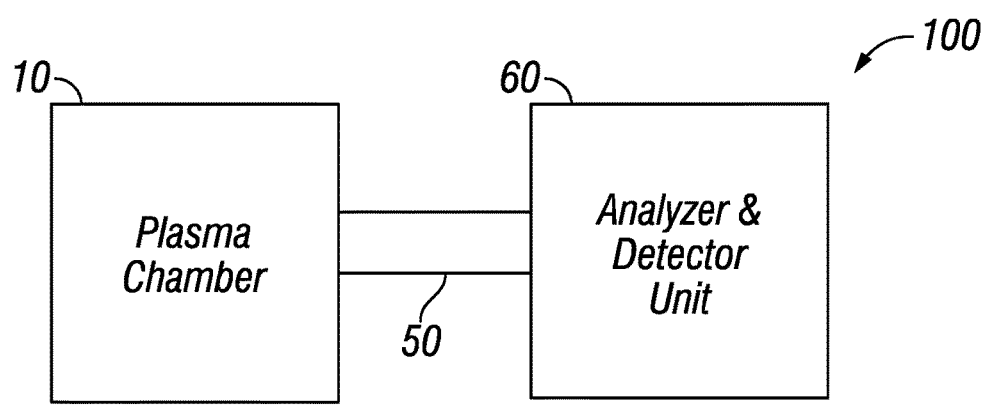
FIG. 7 schematically shows an exemplary embodiment of an emission spectrometer comprising a plasma source chamber according to the present invention.

An emission spectrometer comprising a plasma source chamber according to the invention may further comprise a plasma torch, a gas (e.g. argon) source, a sample introduction system for introducing a sample to be analyzed into the plasma, and a detector arrangement for detecting emitted light. An exemplary embodiment of an emission spectrometer is schematically illustrated in FIG. 7, where the spectrometer 100 is shown to comprise a plasma chamber 10 and an analyzer and detector unit 60, which are coupled by a light duct 50. The plasma chamber 10 according to the invention may be the plasma chamber illustrated in FIG. 2 or 3, for example. The analyzer and detector unit 60 may include a detector unit for detecting emitted light according to the prior art, for example an optical analyzer and/or an optical detection system.

The light duct 50 may be constituted by the axial and radial viewing elements described above, such as the viewing element 32 and the periscope 39 protruding into the inner housing 11 through the openings 34 and 36 respectively (see FIGS. 4 & 6).

It will be understood by those skilled in the art that the invention is not limited to the embodiments shown and that many modifications and additions can be made without departing from the invention as defined in the appending claims.

The invention claimed is:
1. A plasma torch chamber for use in a spectrometer, the plasma torch chamber comprising:
an inner housing comprising a plurality of walls for accommodating a plasma torch within the inner housing;
an outer housing comprising a plurality of walls and accommodating the inner housing; and
a shielding element arranged for covering two substantially perpendicular walls of the outer housing, said shielding element and said two walls of the outer housing defining a further spacing that extends between said shielding element and said walls of the outer housing so as to allow a first flow of air between said shielding element and the outer housing, one of said walls of the outer housing preferably being, in use, a top wall,
wherein the outer housing comprises at least one outer air inlet opening in a first wall of the outer housing and at least one outer air outlet opening in a second wall of the outer housing, wherein the walls of the inner housing and the walls of the outer housing define a spacing so as to allow a second air flow from the at least one outer air inlet opening to the at least one outer air outlet opening through the spacing between the inner housing and the outer housing, wherein the inner housing comprises at least one inner air inlet opening in a first wall of the inner housing and at least one inner air outlet opening in a second wall of the inner housing to allow a third air flow from the at least one inner air inlet opening to the at least one inner air outlet opening through the inner housing, and wherein each of the inner housing and the outer housing has an opening therein to accommodate an axial viewing element that is located above the plasma torch.

2. The plasma torch chamber according to claim 1, wherein the walls, the inlets and the outlets are arranged such that in use the second air flow is greater than the third air flow.

3. The plasma torch chamber according to claim 1, wherein the at least one outer air inlet opening and the at least one outer air outlet opening are arranged in opposite walls of the outer housing.

4. The plasma torch chamber according to claim 1, wherein the at least one outer air inlet opening is located, in use, lower than the at least one outer air outlet opening.

5. The plasma torch chamber according to claim 1, wherein the at least one outer air outlet opening is larger than the at least one outer air inlet opening.

6. The plasma torch chamber according to claim 1, wherein the at least one outer air inlet opening extends over substantially the width of a wall of the outer housing.

7. The plasma torch chamber according to claim 1, wherein the at least one outer air outlet opening extends over substantially the width of a wall of the outer housing.

8. The plasma torch chamber according to claim 1, wherein the at least one inner air inlet opening and the at least one inner air outlet opening are arranged in opposite walls of the inner housing.

9. The plasma torch chamber according to claim 1, wherein the at least one inner air inlet opening is located, in use, lower than the at least one inner air outlet opening.

10. The plasma torch chamber according to claim 1, wherein the at least one inner air outlet opening is larger than the at least one inner air inlet opening.

11. The plasma torch chamber according to claim 1, wherein the at least one inner air inlet opening extends over substantially the width of a wall of the inner housing.

12. The plasma torch chamber according to claim 1, wherein the at least one inner air outlet opening extends over substantially the width of a wall of the inner housing.

13. The plasma torch chamber according to claim 1, wherein the at least one inner air inlet opening is in direct communication with the spacing between the inner housing and the outer housing.

14. The plasma torch chamber according to claim 1, wherein the at least one inner air inlet opening is connected to a duct which extends through the spacing and through a wall of the outer housing so as to allow a flow of air from outside the outer housing.

15. The plasma torch chamber according to claim 1, wherein the at least one inner air outlet opening is in direct communication with the spacing between the inner housing and the outer housing.

16. The plasma torch chamber according to claim 1, wherein the at least one inner air outlet opening is connected to a duct which extends through the spacing and through a wall of the outer housing so as to allow a flow of air to the outside the outer housing.

17. The plasma torch chamber according to claim 1, wherein the inner housing is removable.

18. The plasma torch chamber according to claim 1, wherein the inner housing has at least one further air inlet opening in a wall which is, in use, a bottom wall.

19. The plasma torch chamber according to claim 1, arranged for accommodating the plasma torch, wherein the plasma torch is oriented vertically.

20. The plasma torch chamber according to claim 1, arranged for accommodating the plasma torch, wherein the plasma torch is oriented horizontally.

21. The plasma torch chamber according to claim 1, wherein the plasma torch is an inductively coupled plasma torch.

22. The plasma torch chamber according to claim 1, further comprising an inner door for the inner housing and an outer door for the outer housing.

23. The plasma torch chamber according to claim 22, wherein at least one of the inner door and the outer door is a sliding door.

24. The plasma torch chamber according to claim 22, wherein the inner door and the outer door are connected such that opening or closing the outer door also opens or closes the inner door.

25. The plasma torch chamber according to claim 1, wherein each of the inner housing and the outer housing further has an opening therein to accommodate a radial viewing element.

* * * * *